United States Patent [19]
Self et al.

[11] Patent Number: 5,495,484
[45] Date of Patent: Feb. 27, 1996

[54] DISTRIBUTED TELECOMMUNICATIONS SWITCHING SYSTEM

[75] Inventors: L. David Self, McKinney; Clement R. Nickle, Jr., Garland; Frederick H. Skoog, Colleyville, all of Tex.

[73] Assignee: DSC Communications Corporation, Plano, Tex.

[21] Appl. No.: 135,724

[22] Filed: Oct. 12, 1993

[51] Int. Cl.$^6$ ............................................. H04J 3/12
[52] U.S. Cl. ..................... 370/110.1; 370/55; 370/85.12; 379/84
[58] Field of Search ............................. 370/55, 60, 60.1, 370/61, 94.1, 94.2, 109, 110.1, 95.1, 95.3, 85.12; 379/84, 309; 348/12

[56] References Cited

U.S. PATENT DOCUMENTS

| | | | |
|---|---|---|---|
| 4,625,308 | 11/1986 | Kim et al. | 370/95.3 |
| 4,750,036 | 7/1988 | Martinez | 348/12 |
| 5,293,379 | 3/1994 | White | 370/55 |
| 5,351,235 | 9/1994 | Lahtinen | 370/95.1 |
| 5,355,362 | 10/1994 | Gorshe et al. | 370/110.1 |

Primary Examiner—Douglas W. Olms
Assistant Examiner—Shick Hom
Attorney, Agent, or Firm—Baker & Botts

[57] ABSTRACT

A distributed personal communication service system (30) includes a plurality of delivery units (14) under the control and supervision of a service unit (12). Each delivery unit (14) receives wireless call information from a plurality of radio transceivers (32) as transmitted by wireless hand held personal telephone units (34) within a zone of coverage (36) of the radio transceivers (32). Each delivery unit (14) provides the switching function and network interfaces to transmit the call information to other delivery units (14) along a fiber optic ring (16) or other wireless or wire line networks. Each delivery unit (14) also outputs call information to the radio transceiver (32) for transmission to and receipt by the wireless personal telephone unit (34). Each delivery unit (14) supports wire line telephony network interfaces through interconnection to central offices (38), local exchange carriers, and interexchange carrier carriers. The service unit (12) controls and directs each delivery unit (14) in the switching of call information from origination to destination.

27 Claims, 7 Drawing Sheets

DISTRIBUTED TELECOMMUNICATIONS SWITCHING SYSTEM

TECHNICAL FIELD OF THE INVENTION

The present invention relates in general to telecommunications systems and more particularly to a distributed telecommunications switching system.

BACKGROUND OF THE INVENTION

The trend in telecommunication systems of today is toward increased mobility, as evident in the cellular environment where nearly ninety percent of new cellular phone sales are portable units. However, portable cellular phones require relatively high power, have a limited talk time duration, and are relatively high in price for a subscriber. Further, the transmission path for cellular traffic goes from a radio port to a radio port controller where it travels through a private line facility through a local central office to a central switching facility. The central switching facility switches the call traffic to a nearby central office where it is trunked back to the local central office for termination. Such a roundabout switching path is expensive and time consuming in operation.

Telecommunication subscribers demand small, light weight, hand held portable phones with longer talk times and lower power requirements at a lower cost to the subscriber. The demand and trend has led to a personal communications service, a tetherless local access service that will serve a variety of business and residential communities of interest. However, presently discussed personal communication networks are dependent upon conventional wireline switching systems similarly used with cellular traffic. These conventional wireline switching systems employ centralized switching facilities which cause the lengthy switching path described above. Therefore, it is desirable to have a distributed telecommunications switching system that can provide a calling service through low power, long talk time, hand held portable communication devices that avoids the centralized switching facility requirement.

From the foregoing, it may be appreciated that a need has arisen for a distributed telecommunications switching system that can process call information without the use of a centralized switching facility. A need has also arisen for a specific application of a communications network in the form of a personal communications service network that can provide improved service to telecommunication subscribers. Further, a need has also arisen for a personal communications service network that can utilize existing wire line equipment while implementing its own switching architecture. Additionally, a need has arisen for a personal communications service network that has a minimal dependency upon local exchange carriers and centralized switching facilities.

SUMMARY OF THE INVENTION

In accordance with the present invention, a distributed telecommunications switching system is provided which substantially eliminates or reduces disadvantages and problems associated with conventional telecommunication systems.

According to an embodiment of the present invention, there is provided a distributed telecommunications switching system that includes a plurality of delivery units to provide network telephony interfaces and radio system interfaces in order to receive and transmit call information to and from wire line and wireless communication devices. Each delivery unit provides call information to destination communication devices by local switching through other delivery units or other personal communications networks. A service unit provides centralized control, administration, operations, and maintenance for all delivery units under its control in order to direct where and how each delivery unit is to deliver the call information.

The distributed telecommunications switching system of the present invention provides various technical advantages over conventional telecommunication systems. For example, one technical advantage is co-locating the delivery units that provide call information switching within each community of interest or geographical area where a significant quantity of service traffic is originated or terminated. Another technical advantage is in reducing dependency upon local exchange carriers by providing separate switching, independent service transport, and intelligent network services. Yet another technical advantage is in having a service unit to provide centralized control of the delivery units and their distributed switching. Still another technical advantage is in having centralized service management capabilities. Other technical advantages are readily apparent to one skilled in the art from the following figures, descriptions, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which.

DETAILED DESCRIPTION OF THE INVENTION

Figure 1:
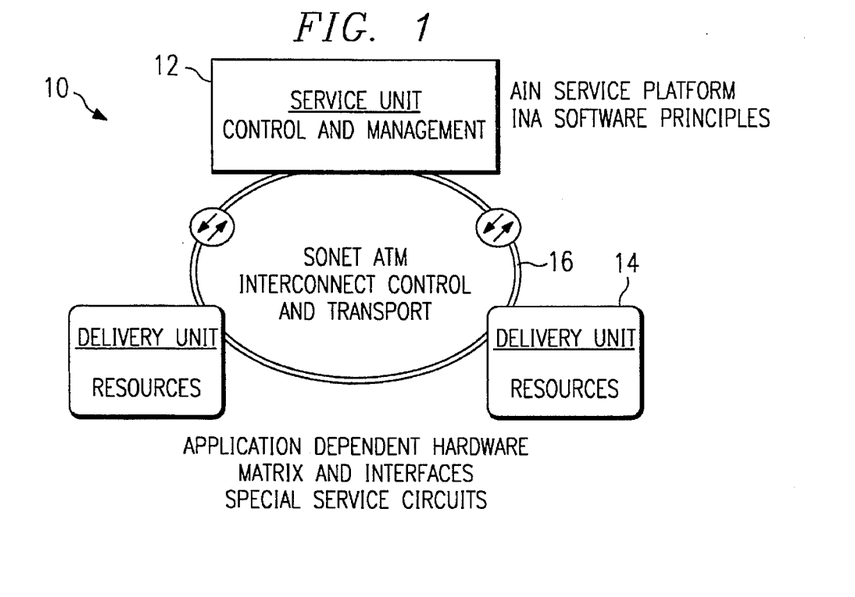
FIG. 1 illustrates a block diagram of a distributed telecommunication switching system.

FIG. 1 is a block diagram of a distributed telecommunications switching system 10. Distributed telecommunications switching system 10 includes a service unit subsystem 12 that provides control and management on an advanced intelligent network (AIN) service platform using information network architecture (INA) software design principles.

Distributed telecommunications switching system 10 also includes a plurality of delivery unit subsystems 14 that provide the message transport mechanism for call information under the control and direction of service unit subsystem 12. Service unit subsystem 12 and delivery unit subsystems 14 communicate with one another through a fiber optic ring 16. Call information is transported between delivery unit subsystems 14 and between service unit subsystem 12 and each delivery unit subsystem 14 on fiber optic ring 16 in asynchronous transfer mode (ATM) cell format.

Service unit subsystem 12 provides the control and management functions for distributed telecommunications switching system 10 and is separated from the transport mechanism function of delivery unit subsystem 14. This separation of functionality allows service unit subsystem 12 and delivery unit subsystem 14 to independently evolve and be upgraded to support new services or new technologies for unique enhancements to service unit subsystem 12 or delivery unit subsystems 14. Service unit subsystem 12 can support multiple types of delivery unit subsystems 14 that can provide multiple services including broadband, video, conventional telephone, and personal communications services. Service unit subsystem 12 and delivery unit subsystems 14 of distributed telecommunications switching system 10 may be geographically grouped within a single area or geographically disbursed in several remote areas while maintaining the distributed nature of the switching function performed.

Figure 2:
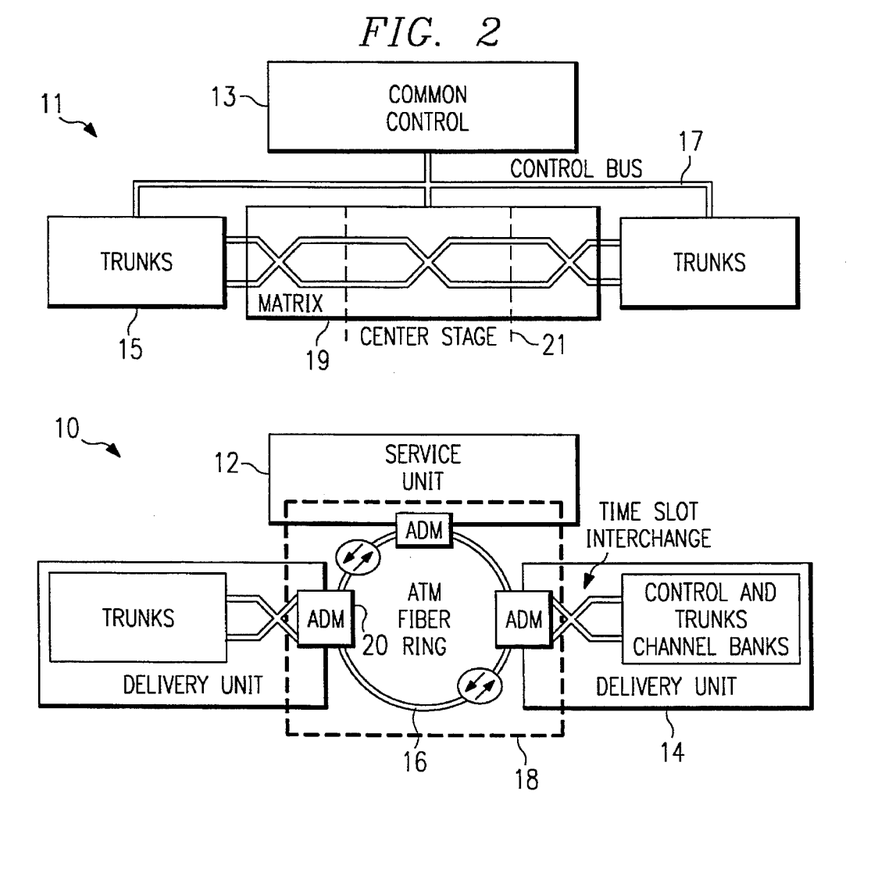
FIG. 2 illustrates a block diagram of a conventional switching system as compared to the distributed telecommunication switching system.

FIG. 2 is a block diagram comparing a conventional switch architecture 11 with the architecture of distributed telecommunications switching system 10. Conventional switch architecture 11 includes a common control unit 13 that communicates to trunk units 15 through a control bus 17. Trunk units 15 interface with each other through a matrix 19 having a center stage 21. Distributed telecommunications switching system 10 is classified into three types of subsystems—a service unit subsystem 12, a delivery unit subsystem 14, and a distributed center stage switching subsystem 18. Distributed center stage switching subsystem 18 allows communication between service unit subsystem 12 and delivery unit subsystem 14 and between multiple delivery unit subsystems 14 through fiber optic ring 16 having add/drop multiplexers (ADM) 20 to interface with each subsystem.

Information received by and transmitted from delivery unit subsystem 14 is time slot interchanged prior to and after transmission to and from fiber optic ring 16 and add/drop multiplexer 20, respectively, of distributed center stage switching subsystem 18. Distributed center stage switching subsystem 18 allows for the replacement of the center stage matrix 21 and control bus structure 17 found in conventional switching architecture 11 through the use of fiber optic ring 16.

The centralized control and management provided by service unit subsystem 12 allows an end user to be connected to different delivery unit subsystems 14 while maintaining a common directory number. Conventional switching systems would require two directory numbers in order to connect an end user to two different switches. Service unit subsystem 12 exceeds telecommunications reliability requirements by providing fault tolerance such that single point failures can occur without loss of information. Service unit subsystem 12 also provides a centralized control for services, connection, maintenance, and external signaling interfaces to other switching systems.

Delivery unit subsystem 14 provides the switching fabric for distributed telecommunications switching system 10. Distributed telecommunications switching system 10 can support multiple delivery unit subsystems 14 that can provide a multitude of services. These services include broadband interfacing, cable applications, telephony interfacing, and personal communication services. Delivery unit subsystems 14 may be dedicated to a specific type of service or multiple services may be accommodated within a single delivery unit subsystem 14.

Distributed center stage switching subsystem 18 allows for communication of service control, user traffic transport (including video, data, image, and voice), and operations, administration, maintenance, and provisioning (OAM&P) message transport through fiber optic ring 16. Fiber optic ring 16 provides quality information transmission and dual physical path transmission capability. Information may be transmitted between subsystems along one portion of fiber optic ring 16, leaving other portions of fiber optic ring 16 available for simultaneous transmissions between other subsystems within distributed telecommunications switching system 10. Distributed center stage switching subsystem 18 can dynamically allocate and reallocate bandwidths for fiber optic ring 16 transmission in order to handle times of increased information transmission demand. The bandwidth of fiber optic ring 16 may also be allocated to support concurrent multiple services and concurrent multi service transport and allow for simultaneous use of a specific bandwidth during simultaneous transmissions on different portions of fiber optic ring 16.

Figure 3:
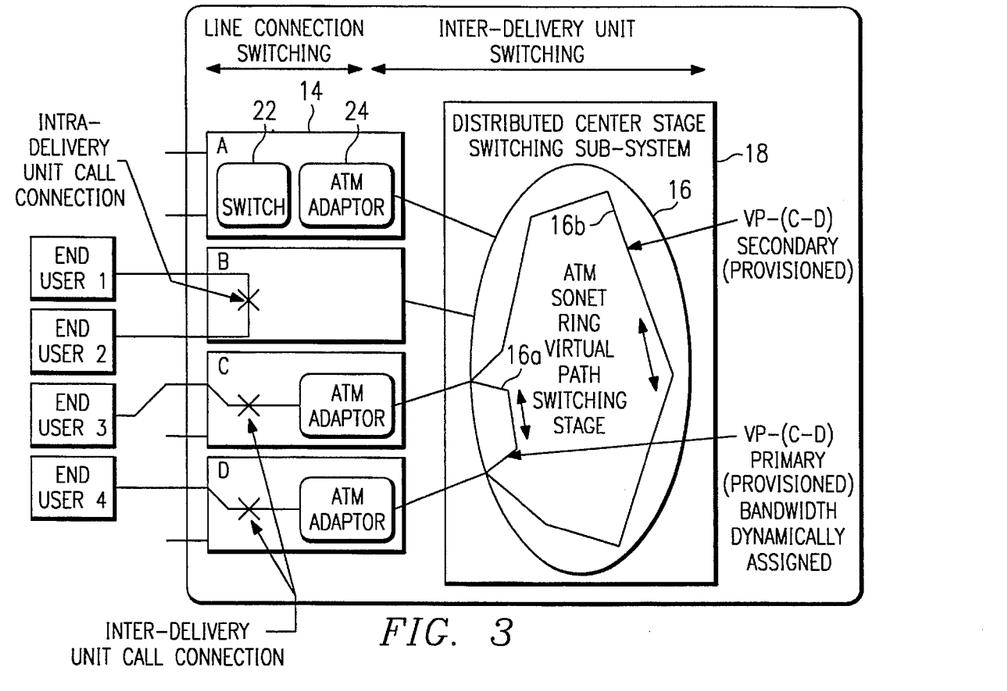
FIG. 3 illustrates a block diagram of an example of switch connections within the distributed telecommunication switching system.

FIG. 3 is a block diagram of an example of switch connection routing for distributed telecommunications switching system 10. Each delivery unit subsystem 14 performs switching connections for end users in a switch function 22 and the ATM cell adaptation in an ATM adaptor 24 in order to interface with fiber optic ring 16 of distributed center stage switching subsystem 18. For an intra-delivery unit call connection, switching function 22 connects end user 1 with end user 2 within delivery unit B without the necessity of interfacing with fiber optic ring 16. This intra-delivery unit call connection is performed by all delivery unit subsystems 14 with corresponding end users for the origination and destination of a call.

For an inter-delivery unit call connection, end user 3 originates a call that is processed by its corresponding delivery unit C. Switch function 22 of delivery unit C makes the appropriate connection to ATM adapter 24 and subsequent placement of information on fiber optic ring 16. Distributed center stage switching subsystem 18 selects a primary path 16a for information transmission to destination delivery unit D. Distributed center stage switching subsystem 18 also allocates an appropriate bandwidth for transmission of information on primary path 16a of fiber optic ring 16. Destination delivery unit D receives the call information and performs translation at ATM adapter 24 and connection at switch function 22 to appropriate end user 4.

In the event that primary path 16a is damaged or unavailable, call information transmission from delivery unit C to delivery unit D may still occur along secondary path 16b. Distributed center stage switching subsystem 18 allows for dual path interconnection of subsystems in order to provide continuous operation of switch connections for overcoming any breaks or cuts in fiber optic ring 16. If call information can flow through primary path 16a, the portions of fiber optic ring 16 corresponding to secondary virtual path 16b can be available for use by other delivery units for simultaneous transmission of multiple sets of call information at the same allocated bandwidth in order to increase the transmission capacity of fiber optic ring 16.

For calls made between delivery unit subsystems 14 of different distributed telecommunications switching systems, the call connection can be made as in delivery unit B or delivery units C and D with originating end users 1 and 3 and end users 2 and 4 as remote destination delivery units, respectively. The originating end user, the destination end user, and the link between separate delivery unit subsystems determine the appropriate connections for the call between different telecommunications switching systems.

Figure 4:
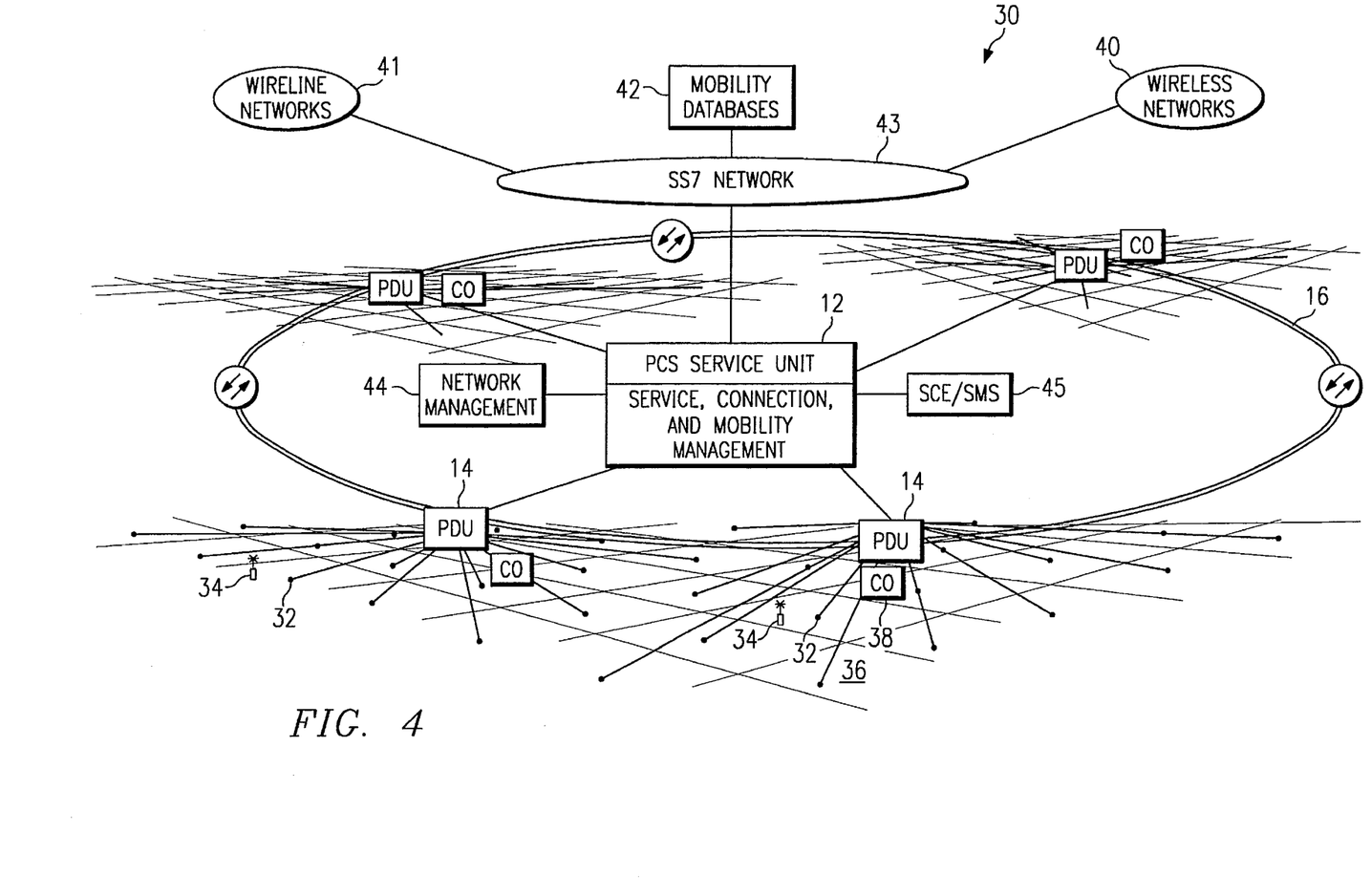
FIG. 4 illustrates a simplified diagram of an architecture applying the distributed telecommunications switching system within a personal communications service environment.

FIG. 4 is a block diagram of a specific application of distributed telecommunications switching system 10. FIG. 2 shows a distributed personal communications service (PCS) system 30 for operation within a particular service area composed of multiple service communities of interest. Distributed PCS system 30 includes a service unit 12 that communicates to a plurality of delivery units 14. Delivery units 14 receive and transmit call information from and to a plurality of radio frequency transceivers 32 as well as conventional wireline facilities. Radio frequency transceivers 32 receive call information from originating lightweight, portable personal telephone units 17 within a specific zone of coverage 36 and transmit call information to similar portable personal telephone units 34 as determined by delivery units 14 and service unit 12. All delivery units are interconnected by a fiber optic ring 16 as shown. Delivery units 14 may also receive and transmit call information through local central offices 38 co-located with each delivery unit 14 within a specific community of interest.

Service unit 12 is shown in a logical centralized configuration but still physically couples to fiber optic ring 16 as previously described. Service unit 12 communicates with each delivery unit 14 and also communicates with other wireless networks 40, wire line networks 41, and mobility databases 42, through an SS7 signalling network 43. Service unit 12 also communicates with a network manager 44 to enable external operations and maintenance activities.

Service unit 12 communicates with a service creation environment (SCE) and service management system (SMS) processor 45 to enable development of reusable services in order to minimize the development cycle, and significantly increase the speed and reliability of new service deployment. Service unit 12 employs advanced intelligent network (AIN) and information network architecture (INA) concepts enabling rapid service introduction through application modularity, reusability, and portability. The modularity aspect of distributed PCS system 30 allows for operating a variety of hardware and software products developed and modified by different vendors at different times. Service unit 12 and delivery units 14 are designed according to Information Network Architecture (INA) principles that separate service control from service delivery functionality. The separation of service control from service delivery allows distributed PCS system 30 to evolve as new services are developed and additional services are provided.

In operation, distributed PCS system 30 handles calls to and from wireless personal telephone units 34. Call information is transmitted from an originating personal telephone unit 34 to an originating radio frequency transceiver 32 within a zone of coverage 36 of personal telephone unit 34. Call information is transferred from originating radio frequency transceiver 32 to an originating delivery unit 14. Originating delivery unit 14 performs the necessary switching operation to deliver the call information to its appropriate destination as directed by service unit 12. Service unit 12 provides centralized control, operation, administration, and maintenance for each delivery unit 14 to assist in the delivery of the call information.

Originating delivery unit 14 switches the call information to the appropriate destination delivery unit 14 over fiber optic ring 16. Destination delivery unit 14 sends the call information to an appropriate destination radio frequency transceiver 32 for transmission to an appropriate destination personal telephone unit 34. For destinations outside distributed PCS system 30 or within a wire line network, destination delivery unit 14 sends the call information to its associated central office 38 for transmission over the public switch telephone network to a wire line telephone or a delivery unit within another distributed PCS network.

Fiber optic ring 16 is a self healing asynchronous transfer mode (ATM) synchronous optical network (SONET) ring that provides high speed transfer of call information along two possible paths to and from origination and destination delivery units 14. Fiber optic ring 16 forms the center stage of the distributed telecommunications switching system 10 implemented in distributed PCS system 30. Fiber optic ring 16 is utilized whenever two or more delivery units 14 are associated with a call as determined by applications software within service unit 12. In the event of a fiber cut, the self healing nature of fiber optic ring 16 provides for virtual path rerouting for call information transportation. Distributed PCS system 30 has the most power and flexibility when implemented with fiber optic ring 16. However, if distributed PCS system 30 is comprised of a smaller number of delivery units 14, point to point fiber optic connections may be implemented in distributed PCS system 30 between delivery units 14 for call information transmission.

Figure 5:
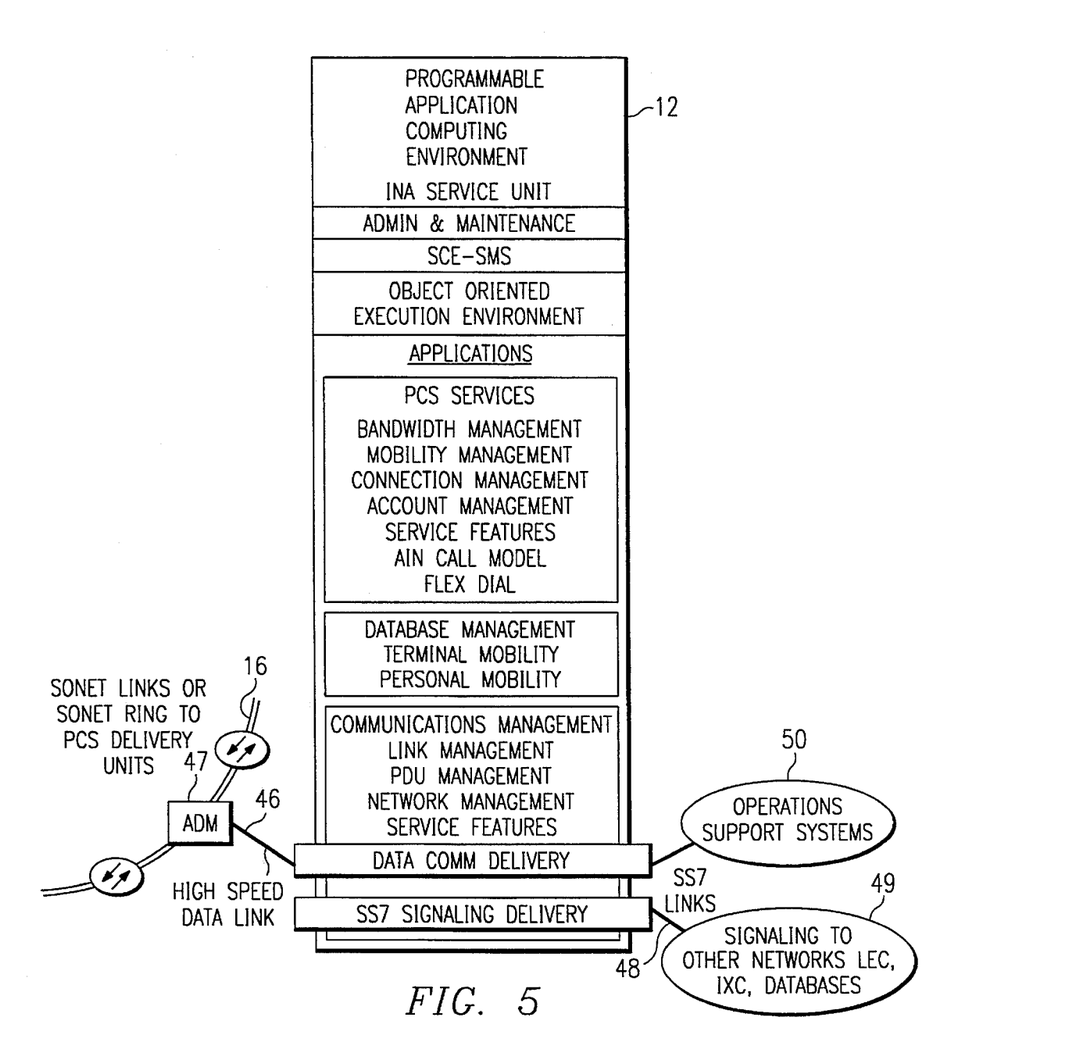
FIG. 5 illustrates a block diagram of a service unit within the personal communications service environment.

FIG. 5 is a simplified block diagram of service unit 12 showing its various services and applications. Service unit 12 provides centralized service and connection management for distributed PCS system 30 using advanced intelligent network (AIN) concepts. Service unit 12 provides administrative, maintenance, and network level management, and call processing functions, including connection, service, and mobility management. A programmable application computing environment (PACE™) provides the basis for the service unit 12 component of the distributed PCS system 30. Service unit 12 communicates with delivery units 14 over a high speed data link 46 and an add/drop multiplexer interface 47 to the fiber optic ring 16. Service unit 12 communicates to local exchange carriers and interexchange carriers of the public switch telephone network and other networks and databases through SS7 links 48 of the SS7 network 43. The SS7 signaling connection provided by service unit 12 to other networks and databases 49 allows for call set up to external networks and database queries and responses.

During processing of a call, service unit 12 controls the alerting process by establishing that the subscriber unit is capable of communicating and by directing the appropriate delivery unit 14 to establish a voice connection to an appropriate radio frequency transceiver 32 for alerting the subscriber of an incoming telephone call. Calls destined for subscribers are delivered to the appropriate delivery unit 14 that serves the radio frequency transceiver 32 in the area where the subscriber is active. Service unit 12 directs the appropriate delivery unit 14 to deliver the call to the appropriate radio frequency transceiver 32. Service unit 12 interacts with internal databases to determine the subscriber's radio location, status, alerting information, and terminating features. From information stored within the internal databases, service unit 12 controls where and how to deliver the call to the subscriber.

Service unit 12 also works with the appropriate delivery unit to provide originating service for wireless calls. Service unit 12 instructs the appropriate delivery unit 14 to associate the call origination with the subscriber and queries the appropriate database for the subscriber's originating features and controls the delivery unit 14 in providing that set of features. In the event of subscriber movement from one zone of coverage 36 to another zone of coverage 36, service unit 12 controls the actions required to maintain a seamless connection for the call. Service unit 12 controls the transfer between delivery units 14 by controlling switch actions of delivery units 14.

Service unit 12 provides the storage, maintenance, access, and control of the data necessary to provide all the services for distributed PCS system 30. Databases necessary to provide appropriate services include call processing information, encryption information, radio equipment configuration, routing instructions, subscriber features, subscriber location mapping, and subscriber status. The call models, conventionally placed in the switching modules of a cellular and public switched telephone network, appropriate for distributed PCS system 30 are centrally placed within service unit 12. Security provided by service unit 12 includes authentication and registration for the subscribers and terminals. Service unit 12 also provides operations, administration, maintenance, and provisioning (OAM&P) functionality through interfaces to operation support systems 50. Service unit 12 also records and generates details of the call to ensure accurate billing data. By having a centralized control, service unit 12 ensures that each delivery unit 14 can support the various services and features for distributed PCS system 30.

Figure 6:
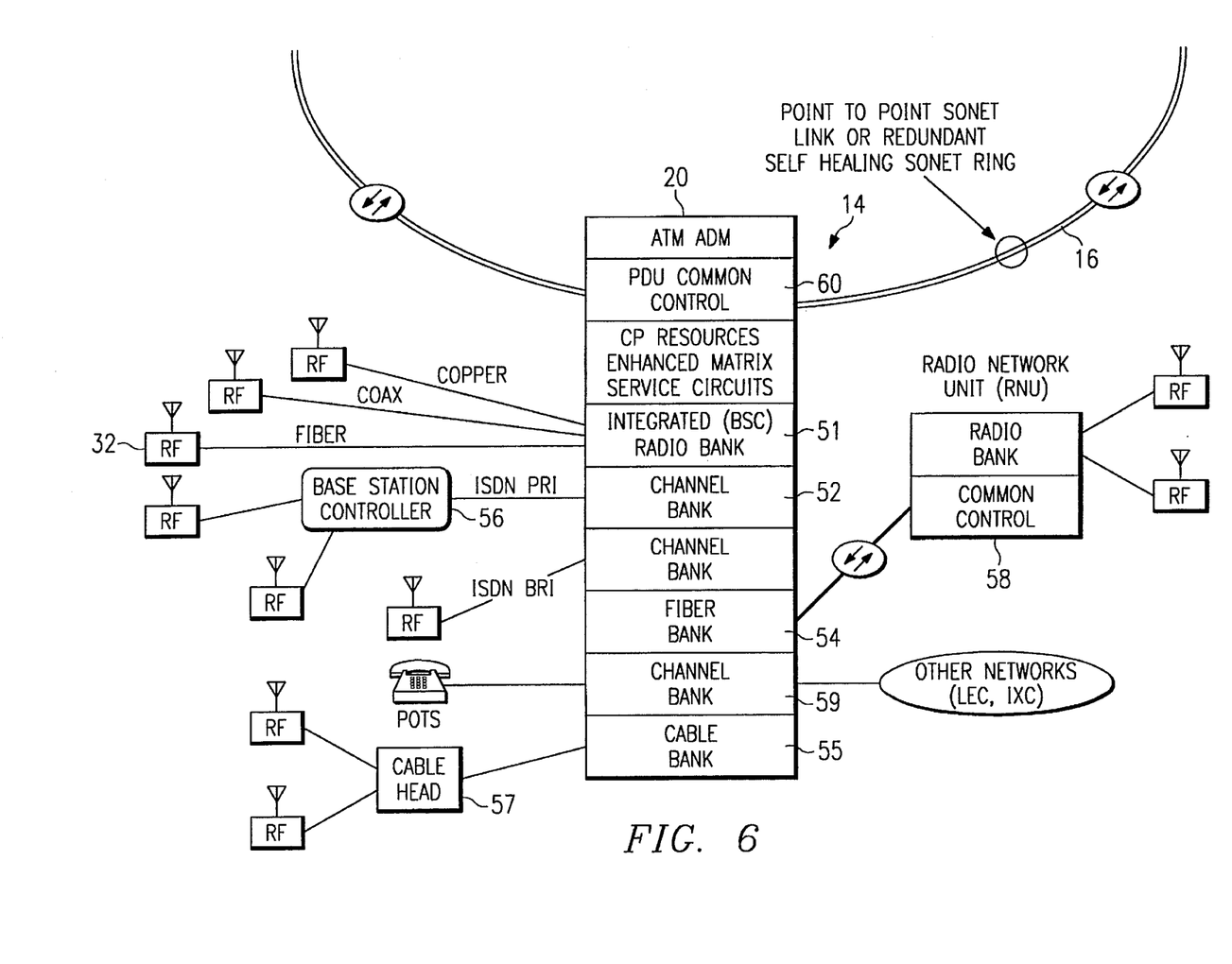
FIG. 6 illustrates a block diagram of a delivery unit within the personal communications service environment.

FIG. 6 is a simplified block diagram of a delivery unit 14. The switching functionality for distributed PCS system 30 is distributed around the service area through delivery units 14 that operate as small switching modules under the centralized control and management of service unit 12. Delivery unit 14 is the local access element providing the switching fabric and network interfaces and interconnected with other delivery units by fiber optic ring 16. Interfacing of delivery unit 14 to fiber optic ring 16 is through an ATM add drop multiplexer 20.

Delivery unit 14 includes an integrated radio bank 51, a channel bank 52, and a fiber bank 54, and a cable bank 55. The use of these different banks allows for delivery unit 14 to accommodate integration of different radio technologies and wireline connectivity. Integrated radio bank 51 provides an interface to a radio frequency transceiver 32 that utilize different communication links, including fiber, coaxial cable, and copper. A base station controller 56 may provide an external interface to a radio frequency transceiver 32 and communicate call information to delivery unit 14 over an integrated services digital network (ISDN) communication link to channel bank 52. Though shown external to delivery unit 14, base station controller 56 may be integrated into delivery unit 14 instead of interconnected via a standard open interface, as similarly shown with respect to integrated radio bank 51. Delivery unit 14 may also interface with a radio network unit 58 that receives communication data from a radio frequency transceiver 32 and relays the data to delivery unit 14 at fiber bank 54 through a fiber optic connection. Switching service using cable television distribution may also be provided by delivery unit 14 through cable bank 55 interface with a cable head 57.

As described above, delivery unit 14 has flexibility to accommodate a variety of radio technologies. Delivery unit 14 can also support conventional wire line and switching technology through interfacing with local exchange carriers and interexchange carriers through a channel bank 59. By providing trunk interfacing to a nearby central office 38, delivery unit 14 allows for ingress and egress of public, local, and interexchange network call information without the need for expensive back haul to a central switch as found in cellular communication transmission. Co-location of delivery units 14 with central office 38 allows access to radio resource distribution facilities and unbundling of services for subscriber specific usage. Delivery unit 14 also has a common control element 60 to provide local control and management and diagnostic capabilities. Common control element 60 also provides a local switching matrix to connect bank channels to bank channels or bank channels to ATM add drop multiplexer 20 interface to fiber optic ring 16 and stand alone emergency operation in the event of isolation from service unit 12.

Figure 7:
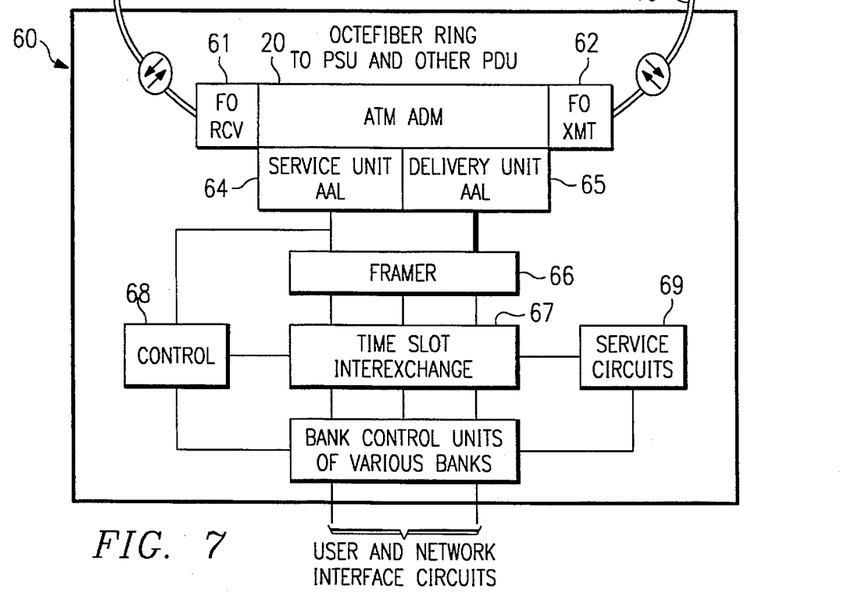
FIG. 7 illustrates a block diagram of a common control element within the delivery unit.

FIG. 7 is a block diagram of common control element 60 of delivery unit 14. Common control element 60 interfaces with fiber optic ring 16 though an optical receiver 61 and an optical transmitter 62 that provide modulation and demodulation of call information for fiber optic ring 16. An add/drop multiplexer 20 processes call information from and to optical receiver 61 and optical transmitter 62, respectively. A service unit ATM adaptation layer (AAL) 64 handles communications between service unit 12 and delivery unit 14. A delivery unit AAL 65 handles call information transfer between delivery units 14. A SONET framer 66 formats call information for placement onto fiber optic ring 16 through delivery unit AAL 65 and provides conversion of call information obtained by optical receiver 61 through delivery unit AAL 65.

Call information to and from SONET framer 66 traverses through a time slot interchanger 67. Time slot interchanger 67 performs the appropriate switching for the call information to and from bank control units found in each of the various banks of delivery unit 14. A control unit 68 includes clock generation, system memory, and control processor functions to control operation of delivery unit 14 as directed by service unit 12. A set of service circuits 69 supervise operation of time slot interchanger 67.

Figure 8:
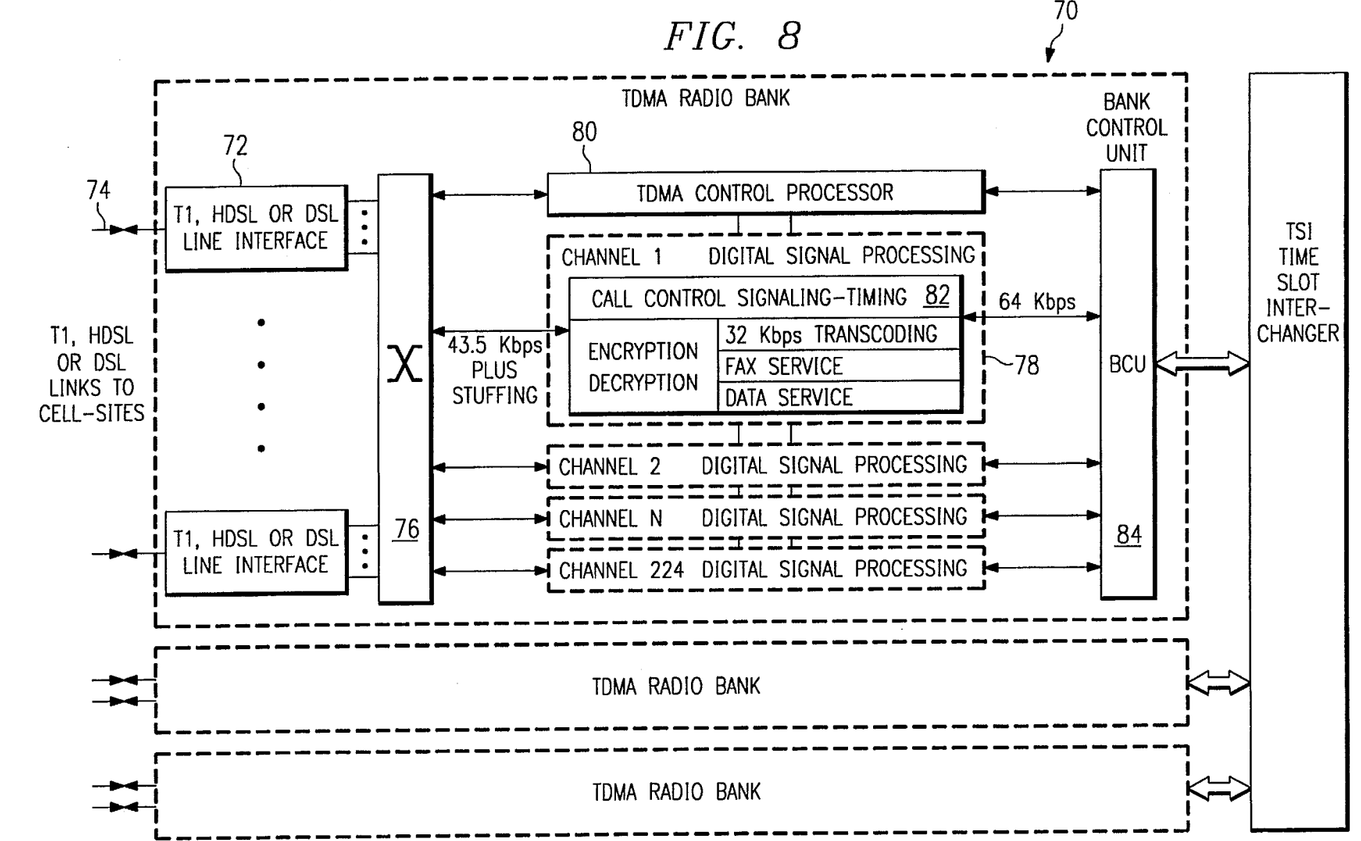
FIG. 8 illustrates a block diagram of a radio bank within the delivery unit.

FIG. 8 is a block diagram of an example of radio bank 70 for use in delivery unit 14. Radio bank 70 has a plurality of line interfaces 72, each line interface 72 connecting to a corresponding radio frequency transceiver 32 over a digital link 74. Each line interface 72 also connects to a selector matrix 76. Selector matrix 76 provides call information from an appropriate line interface 72 to, and receives call information for an appropriate line interface 72 from, a plurality of digital signal processing channels 78. Digital signal processing channels 78 include a call control signaling circuit 82 which are under the control of a control processor 80. Call control signaling circuit 82 performs encryption and decryption of call information, transcoding of call information, fax and data service, as well as other digital signal processing functions. Each call control signaling circuit 82 within each digital signal processing channel 80 receives and transmits call information from and to a bank control unit 84. Bank control unit 84 sends and receives information to and from time slot interchanger 65 of common control element 60 in each delivery unit 14.

Figure 9:
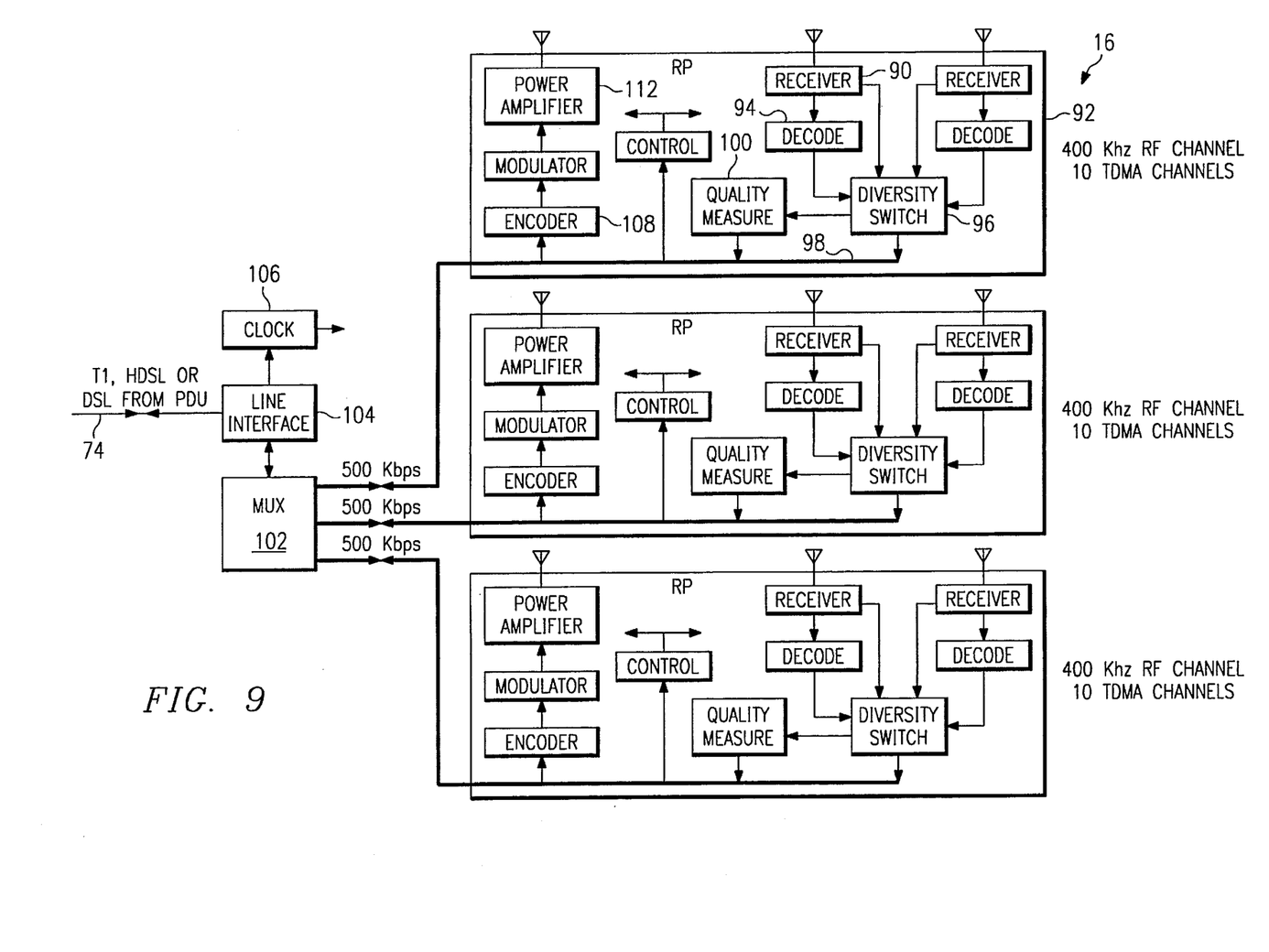
FIG. 9 illustrates a block diagram of a radio frequency transceiver providing information to the radio bank.

FIG. 9 is a block diagram of an example of radio frequency transceiver 32 that interfaces with radio bank 70. Radio frequency transceiver 32 receives call information on redundant receivers 90 of one of a plurality of radio ports 92. Call information is processed by redundant decoders 94 and placed onto signal line 98 by a diversity switch 96. The call information on signal line 98 is processed by a quality measure circuit 100 and switched by a multiplexer 102 to a line interface 104. Line interface 104 transmits the call information to radio bank 70 over digital link 74 according to clock generator 106. For transmission to a wireless subscriber, call information flows from radio bank 70 on digital link 74 through line interface 104 to multiplexer 102. Multiplexer 102 selects an available radio port 92 and sends the call information on signal line 98 to an encoder 108. The call information is modulated by a modulator 110 for transmission to the wireless subscriber by power amplifier 112.

Though a specific radio bank and radio frequency transceiver 32 cell site using time division multiple access (TDMA) technology shown, delivery unit 14 may accommodate other radio banks and radio frequency transceivers having different radio technologies.

In summary, a distributed telecommunications switching system includes a service unit that provides centralized control, administration, and maintenance function for a plurality of delivery units. Each delivery unit is associated with a central office to support local communities of interest and provide easy interconnect for local terminating and originating traffic in a most efficient and economical manner. The delivery units provide the switching function for the distributed personal communications network. Each delivery unit within the distributed telecommunications switching system is tied to each other delivery unit by a fiber optic ring or through a point-to-point fiber connection. Each delivery unit receives call information from personal wireless telephone units through a series of radio frequency transceivers. In a specific application, each delivery unit also can receive wire line transmissions through connection with the public switch telephone network or through its own equipped wireline subscriber interfaces. A delivery unit switches call information to other delivery units or other wire line or wireless networks under the control and supervision of the service unit.

Thus, it is apparent that there has been provided, in accordance with the present invention, a distributed telecommunications switching system that satisfies the advantages set forth above. Although the preferred embodiment has been described in detail, it should be understood that various changes, substitutions, and alterations can be made herein without departing from the spirit and scope of the present invention as defined by the following claims.

What is claim is:

1. A distributed telecommunications switching system, comprising:

a plurality of delivery units for providing subscriber line and/or network trunk interfaces to receive and transmit call control information and call traffic information for a particular call, each of said plurality of delivery units distributed throughout the system to provide a local switching function for said call traffic information according to destination and service requirements of said call control information;

a service unit for providing centralized control, management, and maintenance functions for each of said plurality of delivery units in order to direct where and how each of said plurality of delivery units is to deliver said call traffic information in response to said call control information, said service unit providing said centralized control, management, and maintenance functions independently and separately from said local switching function provided by said plurality of delivery units; and a distributed center stage switching fabric providing a communication path between each of said plurality of delivery units and other of said plurality of delivery units and between said service unit and each of said plurality of delivery units.

2. The system of claim 1, further comprising:

a plurality of radio frequency transceivers each associated with one of said plurality of delivery units for receiving and transmitting call traffic and call control information from and to a plurality of individual radio frequency portable units associated with each radio frequency transceiver, each of said plurality of delivery units receiving said call traffic and call control information from a corresponding originating radio frequency transceiver and delivering said call traffic information to an appropriate destination radio frequency transceiver as directed by said service unit in response to said call control information.

3. The system of claim 2, wherein each of said plurality of delivery units includes a plurality of radio banks to provide wireless interfaces to local subscribers.

4. The system of claim 1, wherein said distributed center stage switching fabric includes a fiber optic ring that provides multiple communication paths for simultaneous delivery of said call traffic and call control information for a plurality of calls and a plurality of call types.

5. The system of claim 1, wherein said distributed center stage switching fabric includes point to point fiber optic connections to provide multiple communication paths for simultaneous delivery of said call traffic and call control information for a plurality of calls.

6. The system of claim 1, further comprising:

a local central office associated with each of said plurality of delivery to allow communications between subscribers served by said plurality of delivery units and subscribers served by said local central office.

7. The system of claim 1, wherein each of said plurality of delivery includes a plurality of channel banks to provide wireline interfaces to local subscribers.

8. The system of claim 1, wherein each of said plurality of delivery includes a common control element to perform switching of said call traffic and call control information to and from other of said plurality of delivery units under the direction of said service unit.

9. The system of claim 1, wherein each of said plurality of delivery units processes call traffic and call control information in asynchronous transfer mode cells for transfer of call traffic information between said plurality of delivery units and call control information between each of said plurality of delivery units and said service unit.

10. The system of claim 1, wherein said service unit provides various services to subscribers of the network, said service unit being adaptable to provide additional services without affecting operation of existing services.

11. The system of claim 1, wherein each delivery unit includes a cable bank to accommodate cable television distribution for telecommunications services.

12. A distributed personal communications services system, comprising:

a plurality of delivery units for providing wireline and wireless communication interfaces to a plurality of wireless subscribers in order to transmit and receive call traffic information and call control information to and from said wireless subscribers, each delivery unit distributed throughout the system to provide local switching of call traffic information to and from said wireless subscribers according to destination and service requirements within said call control information;

a service unit for providing centralized control, management, and maintenance of each delivery unit to direct where and how each delivery unit is to deliver said call traffic information in response to said call control information;

a fiber optic ring for providing a communication path between each delivery unit and other delivery units and between said service unit and each delivery unit, each delivery unit including an add/drop multiplexer for interfacing with said fiber optic ring in order to process and communicate call traffic and call control information through asynchronous transfer mode cells; and a plurality of radio frequency transceivers associated with each delivery unit for transmitting and receiving said call traffic and call control information to and from said wireless subscribers, each delivery unit receiving said call traffic information from a corresponding originating radio frequency transceiver and delivering said call traffic information to an appropriate destination radio frequency transceiver as directed by said service unit in response to said call control information.

13. The system of claim 12, further comprising:

a local central office associated with each delivery unit to allow communications between a wireless subscriber and a wireline subscriber and between wireline subscribers.

14. The system of claim 12, wherein each delivery unit includes a channel bank to allow communications between a wireless subscriber and a wireline subscriber and between wireline subscribers.

15. The system of claim 12, wherein each delivery unit allows wireline and wireless communications between local subscribers and subscribers on other networks including public and private switched telephone network.

16. The system of claim 12, wherein said service unit locates a particular subscriber and determines that said particular subscriber is capable of communicating call traffic and call control information destined for said particular subscriber, said service unit directing a particular delivery unit associated with a zone of coverage where said particular subscriber is found to establish a communication path to a particular radio frequency transceiver within said zone of coverage and associated with said particular delivery unit and said particular subscriber.

17. The system of claim 16, wherein said service unit controls a transfer of said communication path between delivery units and radio frequency transceivers in the event of subscriber movement from one zone of coverage to a different zone of coverage during a single continuous call.

18. The system of claim 12, wherein said service unit directs a specific delivery unit associated with an originating subscriber to establish an originating connection path for call traffic and call control information from said originating subscriber.

19. The system of claim 18, wherein said service unit controls a transfer of said originating connection path between delivery units and radio frequency transceivers in the event of subscriber movement from one zone of coverage to a different zone of coverage during a single continuous call.

20. The system of claim 12, wherein said service unit performs database queries and initiates call setup procedures for call traffic information destined for external wireline or wireless networks in response to said call control information.

21. A distributed telecommunication switching system, comprising:

a plurality of delivery units each operable to provide at least one of a plurality of telecommunication services, each of said plurality of delivery units being distributed throughout the system and operable to provide a switching function for information to other delivery units according to a telecommunication service associated with said information and according to destination requirements of said information;

a service unit operable to provide control, management, and maintenance functions for each of said plurality of delivery units, said service unit operable to direct how each of said plurality of delivery units is to perform said plurality of telecommunication services said service unit providing said control, management, and maintenance functions independently and separately from said switching function provided by said delivery units; and a fiber optic ring operable to provide a communication path for said plurality of delivery units and said service unit.

22. The distributed telecommunications switching system of claim 21, wherein said plurality of services include broadband, conventional telephone, video, and wireless services.

23. The distributed telecommunications switching system of claim 21, wherein one of said plurality of delivery units provides different services than another of said plurality of delivery units.

24. The distributed telecommunications switching system of claim 21, wherein said fiber optic ring has a bandwidth allocated to support concurrent multiple services and concurrent multi-service transport of said information.

25. The distributed telecommunications switching system of claim 24, wherein each of said plurality of delivery units dynamically allocates said bandwidth of said fiber optic ring according to said information and services associated with said information.

26. The distributed telecommunications switching system of claim 21, wherein said service unit and said plurality of delivery units are adaptable to provide additional telecommunication services without affecting operation of existing telecommunication services.

27. The distributed telecommunication switching system of claim 21, wherein said fiber optic ring provides multiple communication paths between said plurality of delivery units to allow for multiple transfers of information among said plurality of delivery units.

* * * * *